Patented Jan. 8, 1935

1,987,110

UNITED STATES PATENT OFFICE 1,987,110

SYNCHRONIZING SYSTEM

August Karolus, Leipzig, and Fritz Schröter and Waldemar Ilberg, Berlin, Germany; said Karolus assignor to Radio Corporation of America, a corporation of Delaware; and said Schröter and Ilberg assignors to Telefunken Gesellschaft für Drahtlose Telegraphie m. b. H., Berlin, Germany, a corporation of Germany Application July 8, 1930, Serial No. 466,444
In Germany July 9, 1929

2 Claims. (Cl. 172—293)

Many methods for the synchronization of revolving spindles, for instance, in picture telegraphy, television and high-speed multiple telegraphy, etc. are carried into effect by bringing the speeds of rotation of each of the shafts or spindles to be synchronized into a fixed relationship by positively acting means to the frequency of an electric alternating current. Synchronous rotation of the spindles is insured as long as the frequency of the alternating current employed at the sending and at the receiving ends is the same. This is conveniently accomplishable either by the direct transmission of such synchronizing frequency or by separate generation of the same by the aid of local time-tappers such as tuning forks.

The arrangement which is to bring the speed of rotation of a shaft which is to be synchronized into a fixed relationship with the frequency of an alternating current consists often of a synchronous motor having a suitable number of poles and supplied with the alternating current. In this case, the entire synchronizing energy must be supplied from the alternating current source. However, since in the majority of cases the alternating current power available is but small, considerable amplification by thermionic tubes is generally required. Such amplification particularly involves this drawback that for the last or power stage of the amplifier a powerful direct current source must be provided for furnishing the plate potential, and this means an inconvenient increase in the cost of the equipment.

The object of the invention hereinafter to be disclosed is, therefore, an arrangement wherein the necessity of providing a direct current plate potential source for the last stage of the synchronizing amplifier is obviated.

The invention has been shown by the accompanying drawing in several of its preferred forms, wherein.

Figure 1:
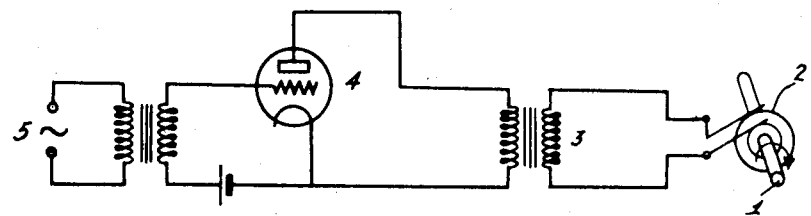
Fig. 1 illustrates one form of control using a single vacuum tube.

With the above object in view, an alternator 2 generating an alternating current of low or medium frequency is associated with the spindle 1 to be synchronized (see Fig. 1) and driven by a motor, which is not shown in the drawing, the number of poles of said alternator 2 being so chosen that, in the presence of the desired synchronous speed of the spindle its frequency is the same as that of the synchronizing alternating current locally produced or transmitted from a distant point. The alternating current potential supplied from alternator 2, if desired, by the intermediary of a transformer 3, is applied to the plate and filament of an amplifier tube 4, the control of which tube 4 is effected at the grid by the transmitted or locally generated synchronizing frequency 5.

The operation of such an arrangement is as follows: Suppose the spindle 1 is kept at synchronous speed by regulation of its drive. The alternator 2 then supplies to the tube 4 an alternating current potential to serve as plate potential whose frequency is the same as that acting at the grid of tube 4 as the control potential from the local or distant time-tapper. The time-mean value of the plate current prevailing in tube 4 will then be greatly dependent upon the mutual phase of both alternating current potentials. Evidently it will be largest when both potentials are in phase, or, in other words, whenever a high grid potential coincides with a high plate potential value. On the other hand, it will be of minimum amount or even zero whenever the phase angle between the potential waves amounts to 180 degrees.

Suppose that at the starting condition here examined, there was present a phase displacement angle intermediate between the said two extreme values, that is, a phase displacement angle of 90 degrees approximately. If, then, owing to a fluctuation in the driving power or the load, the shaft 1 shows a tendency to run at a higher or lower rate of speed, the plate current will rise or fall, as the case may be, in accordance with the change in phase of the alternator potential compared with the time-tapper frequency, with the result that either a growth or a decrease in the load of the dynamo occurs whereby the drive or load fluctuations are absorbed so that synchronous operation is maintained; in other words, the tube 4 operates like a variable brake resistance allowing of regulating the speed of rotation of the shaft 1.

Figure 2:
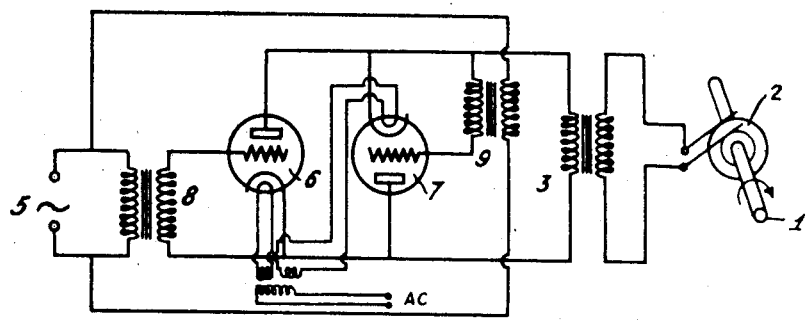
Fig. 2 illustrates a modification thereof using a plurality of vacuum tubes oppositely connected; and, Fig. 3 still a further modification using an eddy current brake.

In the arrangement hereinbefore described, owing to the unilateral conduction of thermionic tube 4, only one half-wave of the alternating current furnished by the alternator is utilized for regulation. This disadvantage can be obviated by a circuit scheme of the kind shown in Fig. 2. The alternator 2 here works upon two tubes 6 and 7 connected in parallel in opposite senses, and each of these tubes allows of the passage of a half-wave. Of course, the filaments of the two tubes should not be galvanically associated. Hence, if the provision of two distinct filament batteries is to be avoided, the heating of the filaments should conveniently be effected either indirectly (as is true of modern lighting-circuit-supplied amplifier tubes) or else be effected by alternating current from windings of a filament transformer insulated from each other. The control potential is supplied to both tubes at the correct phase relation, say, from separate grid transformers 8 and 9.

In order to avoid the second tube it is, however, also feasible to proceed in such a way that the alternating current potentials which act upon the plate or the grid of a tube 4 from the alternator 2 and the time-tapper 5, respectively, are first commutated. Thus also both half-waves are utilized. For the purpose here concerned, the time-tapper frequently in well-known manner may be rectified by tubes, while the commutation of the alternating current supplied from alternator 2 is most suitably insured by mechanical ways and means, say, by a rotating switch 12 or rectifier.

Figure 3:
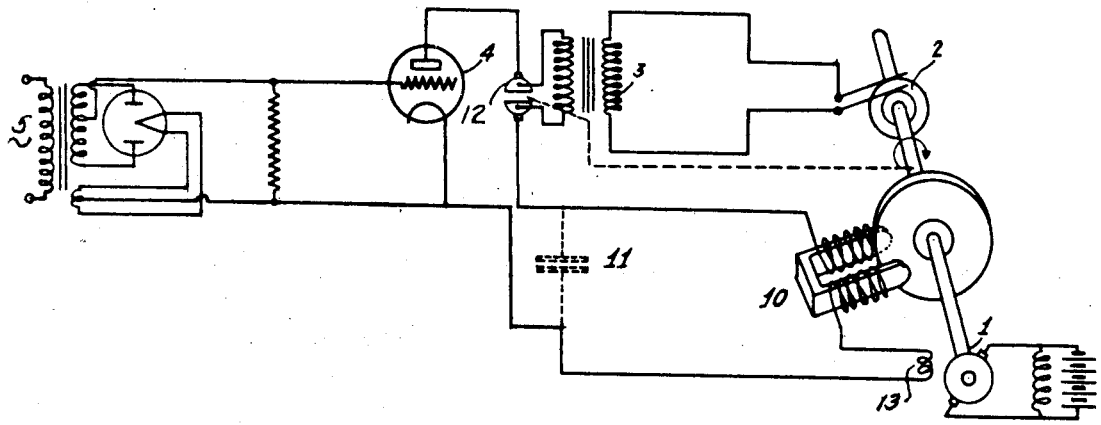

A further development of the regulation principle hereinbefore described is shown in Fig. 3. In this scheme the plate current of tube 4 acts also upon an eddy-current brake 10 mounted upon the spindle to be maintained at synchronous speed. In this way the brake action depending upon the phase position of the potentials and thus the regulation range of the synchronizing device are considerably increased. The winding of the brake magnet, if desired, may further be bridged or by-passed for the alternating current by a condenser 11. With the same effect, instead of an eddy-current brake, the circuit scheme may be so carried into practice by causing the resultant plate current to influence the field 13 of the driving motor in the sense of regulation either way from a mean intensity, that is, so that there occurs an increase or a decrease.

Other modifications and changes may suggest themselves to those skilled in the art to which the invention relates, and we, therefore, believe ourselves to be entitled to make and use any and all of such modifications as fairly fall within the spirit and scope of the hereinafter appended claims.

Having now described our invention, what we claim and desire to secure by Letters Patent is the following:

1. In a speed regulating device, an alternator for generating electrical energy of a frequency proportionate to the speed of rotation of the body to be controlled, an independent source of electrical energy of a frequency corresponding to the frequency generated in the alternator from a desired speed of rotation of the body to be controlled, a full wave rectifier connected with the independent source of controlling frequency, a thermionic device having its input circuit connected with the output circuit of the rectifier and its output circuit connected with the alternator so that varying phase displacements of each of the supplied electrical frequencies produces varying loads upon the alternator to vary the speed thereof, and mechanical means also connected in the output of said thermionic device for utilizing both halves of the alternating current wave generated by said alternator for controlling the speed thereof.

2. A synchronizing system comprising a motor to be maintained at a speed of rotation corresponding to a similar element remotely located with respect thereto, an alternator driven from said motor and adapted to generate electrical energy of a frequency proportional to the speed of rotation of said motor, an independent source of electrical energy of a frequency corresponding to a desired frequency of generated electrical energy from said alternator, a full wave rectifier connected with the independent source of controlling frequency, a phase comparing thermionic device having its input circuit connected with the output circuit of the full wave rectifier, a second rectifier device so connected as to rectify the locally generated energy, said phase comparing device having its output circuit connected with the second rectifier device and its output circuit also so connected as to load the alternator directly in varying degrees in proportion to the phase displacement of each supplied electrical frequency upon the said thermionic device, and an eddy current brake having its electromagnetic winding connected with the output of the phase comparing thermionic device for accentuating the speed control effect on said alternator in accordance with the variations in current flow through said thermionic device.

AUGUST KAROLUS.
FRITZ SCHRÖTER.
WALDEMAR ILBERG.